United States Patent [19]
Traut et al.

[11] 3,787,125
[45] Jan. 22, 1974

[54] COUPLING ASSEMBLY

[75] Inventors: Bernard E. Traut, Wayzaya; Vernon A. Kiffmeyer, Watertown, both of Minn.

[73] Assignee: Washington Scientific Industries, Inc., Minnetonka, Minn.

[22] Filed: May 17, 1971

[21] Appl. No.: 144,236

Related U.S. Application Data

[62] Division of Ser. No. 850,386, Aug. 15, 1969, Pat. No. 3,582,246.

[52] U.S. Cl. .................. 403/13, 403/372, 279/1 L
[51] Int. Cl. ............................................. F16d 1/06
[58] Field of Search .... 287/53 R, 129, 130; 279/16, 279/1 L, 1 Q, 102, 96

[56] References Cited
UNITED STATES PATENTS
3,041,898  7/1962  Better ................................ 279/16
2,869,883  1/1959  Dunbar .............................. 279/1 Q FOREIGN PATENTS OR APPLICATIONS
122,355  1/1919  Great Britain ..................... 279/102

Primary Examiner—Andrew V. Kundrat
Attorney, Agent, or Firm—Burd, Braddock and Bartz

[57] ABSTRACT

A fluid motor having intermittently rotatable vanes sequentially movable between a radial position and a circumferential position by a circuitous cam mechanism having a third harmonic configuration for substantially constant acceleration and decelertion of the vanes resulting in constant force on the vanes. The motor has a rotor mounted on a housing with the use of a combination sharp edge bearing and seal units. A coupling apparatus, having a flexible O-ring, is centered on the end of the drive shaft of the motor.

7 Claims, 8 Drawing Figures

COUPLING ASSEMBLY

CROSS REFERENCE TO RELATED APPLICATION:

This application is a division of U. S. Application Ser. No. 850,386 filed Aug. 15, 1969, now U. S. Pat. No. 3,582,246.

BACKGROUND OF INVENTION

An intermittently rotated vane-type fluid motor has a housing with a chamber carrying a rotor. A plurality of vanes are rotatably mounted on the rotor. A cam mechanism cooperating with the vanes positions the vanes in a vertical working position where a portion of the vane is positioned in a contiguous sealing relation with the housing and a second circumferential relief position wherein the vane is spaced from the housing to permit the escape of fluid from the chamber to an exhaust passageway of the fluid motor. During the power or driving position of the vanes, they are held in a fixed position in relation to the rotor. With the vanes in this position, the bearings on the vanes are not required to withstand the driving forces transmitted to the rotor. During the periods that the vanes are in a radial sealing position, the cam mechanism must orient and hold the vanes to a high degree of accuracy to avoid the loss of the seal with the housing. The vanes, being spaced from the housing, allow the motor to run at a very low rpm without erratic operation. The low internal friction of the motor allows a large starting torque and permits the motor to produce full torque at stall.

The cam mechanism operates to accelerate and deceleration each vane to change its position from the radial position to the circumferential position. During this transition period, there are relatively high accelerations and decelerations of the vane, since the time required for these rotations is relatively short in total relation to one rotor rotation. These large angular rotations produce wear and impact forces that affect the operation of the motor and reduce its effectiveness at high speeds. This type of cam mechanism in a fixed vane fluid motor is shown in U. S. Pat. No. 3,230,891.

The seals and bearings of a rotary motor operating under high fluid pressures are subjected to forces and foreign materials that are detrimental to the operating efficiency of the seals and bearings. The bearings are not equipped with structure which is capable of filtering out foreign particles from the bearing surfaces so that the bearings have relatively short life spans. These bearings do not confine the high pressures to the internal motor chamber so that the seals must withstand high fluid pressures.

Rotary fluid motors are used in combination with other devices, as a tachometer, to measure the speed of the rotor. The tachometer drive is normally attached to the end of the rotor shaft in axial alignment with the shaft. These attachments require the boring of a special axial hole in the shaft. A cylindrical member is press fitted into the hole to form a drive connection. This structure is hard to machine and weakens and at times destroys the end of the rotor shaft. The present invention includes a coupling apparatus which does not destroy the shaft center when attaching a tachometer or other device to the shaft.

SUMMARY OF INVENTION

The invention is directed to an improved fluid displacement device having a rotor carrying a plurality of vane elements. Each vane element is movable between a circumferential position and a radial position. A cam mechanism, operatively connected to each of the vanes, provides cyclic vane orientation during the rotation of the rotor. The cam mechanism includes a continuous cam path having third harmonic configuration curves producing substantially constant vane acceleration and deceleration to maintain a substantially constant force on the vanes reducing wear and impact forces on the cam mechanism.

Another feature of the invention is the use of combination bearing and seal units for rotatably mounting the rotor on the motor housing. Each bearing and seal unit has an inside sharp edge which functions as a filter for the entry of foreign materials larger than a specified size into the bearing surface. Circumferential pressure relief grooves are located in the bearing surface to drain fluid lubricant from the bearing surface and provide pressure balance.

A further feature of the invention is the use of a self-centering coupling apparatus attached to the end of the rotor shaft. The coupling apparatus has a centering projection carrying a flexible annular ring. The annular ring uniformly changes its shape to center the coupling apparatus relative to the shaft center without destroying the shaft center or placing large forces on the shaft.

IN THE DRAWINGS

Figure 1:
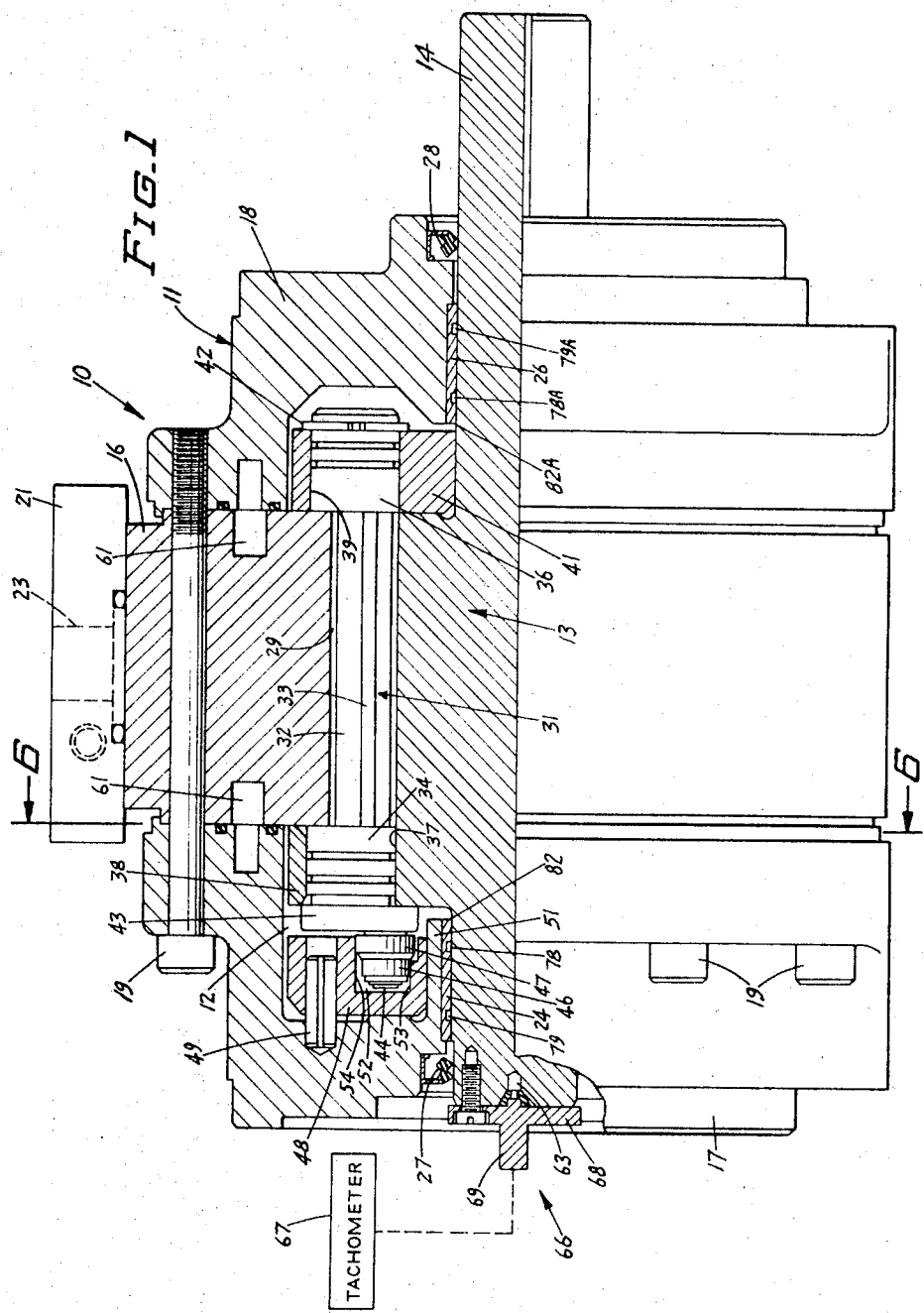
FIG. 1 is a side view partially in section of the hydraulic fluid device of the invention.

Referring to the drawings, there is shown in FIG. 1 a fluid displacement device, indicated generally at 10, having a housing 11 surrounding a chamber 12. Located in chamber 12 is a rotor, indicated generally at 13, having a shaft 14 rotatably mounted on the housing 11. The fluid displacement device 10 may be a hydraulic or pneumatic motor or a pump. The following description is limited to a hydraulic fluid motor.

The housing 11 comprises a circular center sleeve 16 located between end plates 17 and 18. A plurality of bolts 19 extend axially through the end plates 17 and 18 and center sleeve 16 to secure the end plates in sealing relation adjacent opposite sides of the center sleeve. The shaft 14 is rotatably carried on combined sleeve bearing and seal units 24 and 26 located in axially aligned central openings in the end plates 17 and 18 respectively. A seal 27 is mounted on end plate 17 and is in engagement with the outer end of shaft 14. In a similar manner, a seal 28 is mounted on end plate 18 and is in engagement with the opposite end section of shaft 14.

Figure 2:
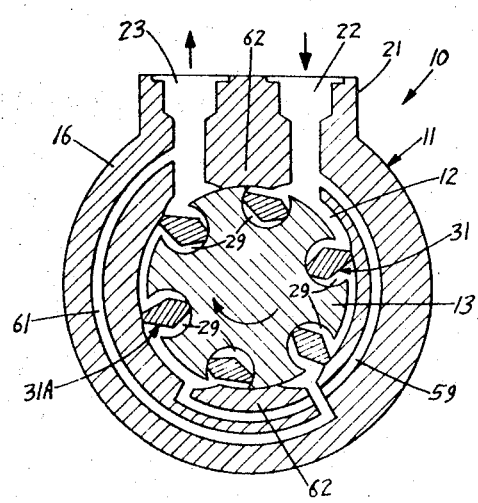
FIG. 2 is a transverse sectional diagrammatic view of the hydraulic fluid device.

As shown in FIG. 2, the center sleeve 16 has an enlarged upright boss 21 having a fluid inlet passage 22 and a fluid outlet passage 23 leading to the chamber 12. The rotor 13 has a plurality of circumferentially spaced pockets or recesses 29. Each recess 29 extends axially of the rotor 13 and is open to the outer peripheral face of the rotor. About one-third of the circumference of the recess is open to the peripheral face of the rotor.

Figure 6:
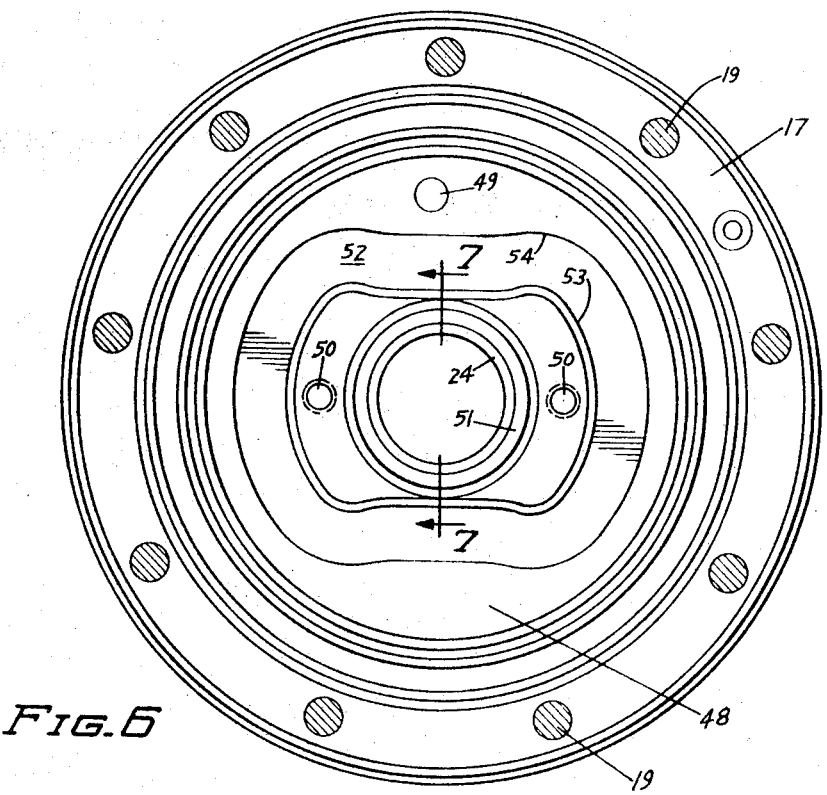
FIG. 6 is a sectional view taken along line 6—6 of FIG. 1 with the vanes removed to show the outline of the control cam groove.

Movably positioned in each recess is a vane, indicated generally at 31. During rotation of the rotor 13, the vanes 31 sequentially move from the circumferential positions to radial positions in sealing relation with the base of the recess and the inside wall of the chamber 12. The circumferential-radial sequence of vane movement occurs twice during each revolution of the rotor. As shown in FIG. 1, the vane 31 is a one-piece member having an elongated linear body 32 with a linear sealing face 33. Integral with the ends of the body 32 are cylindrical members 34 and 36. Member 34 rotatably mounts the vane in a bore 37 located in a radial flange 38 of the rotor. The cylindrical member 36 is rotatably located in a bore 39 in a plate 41 attached to the rotor 13 with fastening members (not shown). A snap ring 42, positioned in a groove on the outer end of member 36, holds the vane in assembled relation with the rotor. Integral with the end of member 34 is a transverse cam 43 carrying a stub shaft or pin 44. The pin 44 extends substantially parallel to the axis of the vane forming a crank arm with arm 43. Rotatably mounted on the pin 44 is a first cam roller or follower 46 and a second larger cam follower or roller 47. The cam followers 46 and 47 cooperate with a cam ring 48 to sequentially control the movements of the vane. A split pin 49 and bolts 50, shown in FIG. 6, attach the cam ring to the inside of end plate 17. The center portion of the cam ring 48 fits over an inwardly directed hub or boss 51 on the end plate 17. The boss 51 has a central opening accommodating the sleeve bearing and seal unit 24. The ring 48 has a continuous channel or groove 52 having an inner cam face or track 53 and an outer cam face or track 54 providing continuous guiding surfaces for the cam followers 46 and 47 respectively. The channel 52 has four corner curves located in a general rectangular pattern to change the orientation of each vane four times during each revolution of the rotor 13. During operation of the motor, the cam followers 46 and 47 alternatively engage the cam tracks to orient the vanes 31 to radial or circumferential positions. Each of the followers 46 and 47 is adapted to run free on its shaft 44 during the period that the other cam follower is in engagement with its cam surface or track. Each vane has similar cam followers located in the groove 52.

As the rotor 13 moves around its axis, the vanes 31 are sequentially rotated from the circumferential position to the radial position and back to the circumferential position twice during each rotation of the rotor. The vanes 31 accelerate and deceleration during the transition from the circumferential position to the radial position and vice versa. The cam mechanism of the invention establishes a substantially constant acceleration and decleration of the vane with the result that a constant force is maintained on the vanes during the period of acceleration and deceleration. This reduces the wear and impact forces on the cam mechanism and vanes providing for effective, smooth operation of the vanes at high speeds. The constant acceleration and deceleration of the vanes is accomplished through an exotic cam design that minimizes any abrupt changes in acceleration of the vane by using a third harmonic curve at each corner of the groove 52 tailored to operate below the natural frequency of the followers. The third harmonic component of the curve reduces the peak acceleration of the follower and avoids resonance. In addition, the third harmonic curve produces smaller dynamic loads and smaller vibration amplitudes thereby eliminating the destructive shock waves that are established at high speeds in the prior art cam designs.

Figure 8:
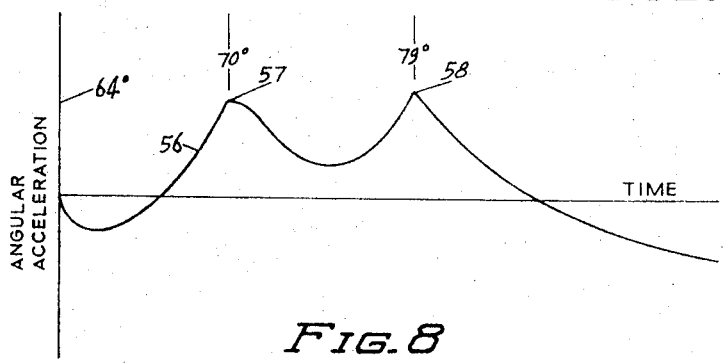
FIG. 8 is a graphic presentation of the acceleration of the vanes during rotation from a circumferential position to a radial position.

The angular acceleration imposed upon the camming members of the fluid device is represented graphically in FIG. 8. The curve 56 shows angular acceleration being the greatest during the transition of the vanes from circumferential to radial position, with peaks 57 and 58 occurring at 70 and 79 degrees. The curve 56 indicates the exotic third harmonic component of the acceleration curve which minimizes the peak acceleration points and provides for constant force on the vanes during the transitional periods from circumferential position to radial position and vice versa.

Referring to FIG. 2, the fluid device 10 operates as a motor upon the introduction of fluid under pressure into the inlet line 22. The fluid under pressure acts on the vanes 31 and 31A. These vanes are located in their radial positions in sealing relation with the wall of the chamber 12. An inlet line 59 in the center sleeve 16 connects the high pressure passage 22 with the lower portion of the chamber 12. An exhaust line 61 connects the bottom portion of the chamber 12 to the exhaust passage 23. The hydraulic pressure, acting on the vanes 30 and 31A, balance the rotor forcing the rotor to move in a clockwise direction. The vanes 31 and 31A continue to seal until they enter the exhaust area. At this point, the next pair of vanes have already entered the pressure cycle. During the radial pressure position of the vanes, they do not roll or rotate relative to the rotor 13. As the rotation of the rotor 13 continues, the cam mechanism rotates the vanes in the exhaust area about 70 degrees counterclockwise to clear the shoes 62. After the shoes 62 are cleared, the vanes are then rotated approximately 70° clockwise to return to a radial sealing position prior to entering the pressure cycle again.

Figure 3:
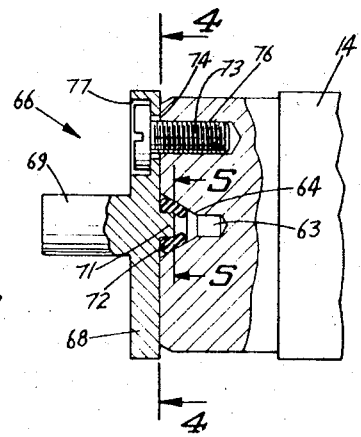
FIG. 3 is a sectional view of the coupling apparatus attached to the end of the drive shaft.

Referring to FIGS. 1 and 3, the shaft 14 has a centering bore or center 63 with a longitudinal axis along the true rotational axis of the rotor 13. The center 63 has an outwardly open cone-shaped recess 64 having a surface concentric with the axis of rotation of the rotor. A coupling apparatus, indicated generally at 66, is attached to the end of the shaft 14 to provide a drive connection to a tachometer 67 used to indicate the speed of rotation of the rotor. The coupling apparatus 66 can be used to attach other types of indicators or machinery to the end of the shaft.

Figure 5:
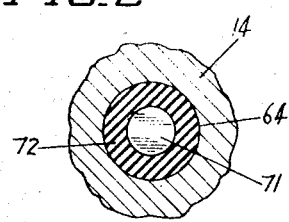
FIG. 5 is an enlarged sectional view taken along line 5—5 of FIG. 3.
Figure 4:
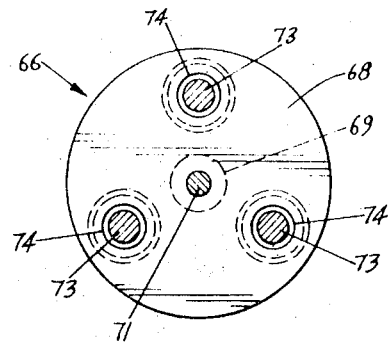
FIG. 4 is a sectional view taken along line 4—4 of FIG. 3.

The coupling apparatus 66 comprises a flat disc 68 having an outwardly directed central hub 69. The opposite side of the disc 68 has an inwardly directed short nipple 71. Both the hub 69 and the nipple 71 are circular members which have a common axis in the center of the disc. This axis is aligned with the axis of rotation of the shaft by the use of an annular deformable pilot ring 72, as a rubber or plastic O-ring. The ring 72 may be made of rubber, plastic, or similar deformable material. The ring 72 is an annular torus with an inner diameter about equal to the diameter of the nipple 71. The ring in the non-deformed shape has a circular cross section and is slightly larger than the length of the nipple 71. The disc 68 is attached to the end of the shaft 14 with a plurality of bolts 73. Each bolt 73 projects through a hole 74 in the disc 68 and is threaded into bores 76 in the end of the shaft 14. The disc 68 has recesses 77 for accommodating the heads of the bolts 73. As shown in FIG. 4, the hole 74 is slightly larger than the diameter of the bolt 76 so that the disc is free to move to an axial aligning position as the bolts are tightened. The resilient deformable pilot ring 72, as it deforms, functions to locate the disc 68 axially of the shaft 14 without a heavy press fit or other connecting structure. The ring 72, as shown in FIG. 5, has an equal amount of material around the nipple 71 and is in circular engagement with the cone-shaped recess 64 to guide the center of the disc in alignment with the axis of shaft 14. The deformable or yieldable O-ring 72 does not destroy the shaft center and does not exert heavy press fit forces on the shaft. Upon removal of the coupling apparatus 66, the shaft center can be used for repair and maintenance work on the rotor.

Figure 7:
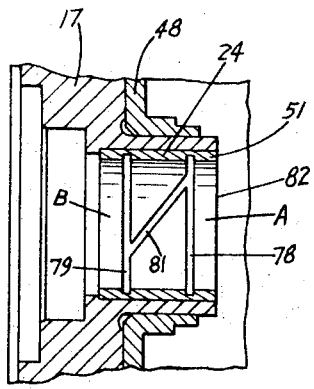
FIG. 7 is an enlarged sectional view taken along line 7—7 of FIG. 6.

The combination sleeve bearing and seal unit 24, rotatably mounting the shaft 14 on the end plates 17, is shown in detail in FIG. 7. The bearing comprises a cylindrical sleeve of bearing material, as brass, bronze or the like, press fitted into the bore in the boss 51 of the end plate 17. The sleeve has a pair of circumferentially extended internal grooves 78 and 79 which are joined to each other with a diagonal groove 81. A plurality of diagonal grooves can be provided to connect portions of the grooves 78 and 79. The film of fluid in the bearing continuously flows through the bearing dissipating bearing heat and carrying away small foreign particles.

As shown in FIG. 7, the grooves 78 and 79 are located inwardly from the opposite edges of the sleeve and function to equalize the pressure of the fluid around the shaft, as well as transfer any foreign materials that enter the bearing through the groove 81 and out past the groove 79. A circumferential surface or land A of the sleeve is located between groove 78 and the inner edge of the sleeve. A similar surface or land B is located between groove 79 and the outer edge of the sleeve. Land A, when motor is under load, will have a tendency to have more clearance than land B. This is due to the deflection of end plate 17. Since oil can more easily enter land A than it can exit from land B, there is a tendency to pressure balance the bearing.

It can be observed that a somewhat larger particle of contamination can enter land A than can exit from land B. This means that the land B area will slowly wear larger until the land B clearance equals the land A clearance when the motor is under load. This wear is self-limiting and achieves automatically what would be very difficult to produce by machining.

After this wear has taken place, there is no further need for a balance bearing since the motor will still have the closed clearance needed to perform its function.

To minimize the size and amount of foreign materials that enter the bearing surfaces of the sleeve, the inner edge of the bearing is provided with a sharp edge 82 located in close proximity to the surface of the shaft 14, as shown in FIG. 1. This sharp edge 82 is specifically put on the sleeve by a cutting or finishing process so that the edge 82 acts as a filter preventing the entrance of foreign particles into the bearing. Any foreign particles that do enter the bearing are of such small size that they easily flow to the grooves 78, 79, 81 and out through the bearing. The larger more abrasive materials are filtered out of the bearing and thus do not create an abrasive action on the bearing surface of the sleeve.

This bearing, for rotatably mounting the shaft 14 on the end plate 17, works in cooperation with the cam followers 46 and 47 to control the operation of the vanes 31. The sleeve bearing 24 accurately locates the rotor 13 in the housing 11. The bearing permits the balancing of hydraulic pressure in the chamber 12 on opposite sides of the vanes to balance the pressure on the side plates. This pressure forces small amounts of fluid between the shaft and the bearing surfaces creating a hydrostatic film of fluid and dissipating any bearing heat. The fluid is returned to a reservoir through a drilled passage between the bearing 24 and seal 27. This bleeding away of the leakage oil permits the use of a low pressure shaft seal 27, with a high internal chamber pressure. Bearing and seal unit 26 is constructed in a similar manner with like parts having the same reference number with suffix A.

While there is shown and described a specific embodiment of a hydraulic fluid motor, it is understood that further modifications and alternative constructions may be made without departing from the scope of the invention. For example, the fluid device may be operated as a pump by connecting the inlet passage 22 to a source of fluid pressure and driving the shaft 14.

The embodiments of the invention in which an exclusive property or privilege is claimed are defined as follows:

1. A coupling assembly connectable to a member having a recess with a cone-like shaped wall comprising: holding means having a cylindrical projecting nipple smaller than and shorter than the recess, a deformable O-ring surrounding said nipple, and bolts attaching the holding means to the member with the nipple projected into the recess, said bolts allowing limited lateral movement of the holding means relative to the member, whereby said deformable O-ring engages the nipple and cone-like shaped wall deforming itself to occupy the recess space around the nipple.

2. The coupling assembly of claim 1 wherein: the member is a shaft having a center recess at one end thereof, said holding means comprising a disc having an outwardly directed hub axially aligned with the nipple, said disc having holes for accommodating the bolts attaching the holding means to the shaft.

3. The coupling assembly of claim 2 wherein: the holes in the disc are larger in diameter than the body of the bolts whereby the disc has limited lateral movement relative to the shaft enabling the O-ring to center the nipple in the recess.

4. The coupling assembly of claim 1 wherein: said holding means comprises a disc having holes for accommodating the bolts attaching the holding means to the member.

5. The coupling assembly of claim 4 wherein: the holes in the disc are larger in diameter than the body of the bolts whereby the disc has limited lateral movement relative to the member enabling the O-ring to center the nipple in the recess.

6. A coupling assembly connectable to a shaft having a center recess with a cone-like shaped wall in one end thereof comprising: a disc having a projecting nipple smaller than and shorter than the recess and an outwardly directed hub axially aligned with the nipple, a deformable O-ring surrounding said nipple, and bolts to attach the disc to the shaft with the nipple projected into the recess, said bolts extended through holes in the disc larger in diameter than the body of the bolts and threaded into one end of the shaft to allow limited lateral movement of the disc relative to the end of the shaft whereby the O-ring centers the nipple in the recess engaging the nipple and cone-like shaped wall deforming itself to occupy the recess space around the nipple.

7. The coupling assembly of claim 6 wherein: the nipple is a cylindrical member.

* * * * *

UNITED STATES PATENT OFFICE
CERTIFICATE OF CORRECTION

Patent No. 3,787,125　　　　Dated January 22, 1974

Inventor(s) Bernard E. Traut et al

It is certified that error appears in the above-identified patent and that said Letters Patent are hereby corrected as shown below:

On the title page, the address of inventor Bernard E. Traut is incorrectly shown as "Wayzaya". This should be --Wayzata--.

Column 1, line 15, "where" should be --wherein--.

Column 1, lines 34 and 35, "deceleration" should be --decelerate--.

Column 3, line 32, "cam" should be --arm--.

Column 3, line 63, "deceleration" should be --decelerate--.

Signed and sealed this 30th day of July 1974.

(SEAL)
Attest:

McCOY M. GIBSON, JR.　　　　C. MARSHALL DANN
Attesting Officer　　　　　　Commissioner of Patents